Feb. 11, 1936. E. J. SVENSON 2,030,335
MATERIAL WORKING APPARATUS
Filed May 15, 1931 3 Sheets-Sheet 3
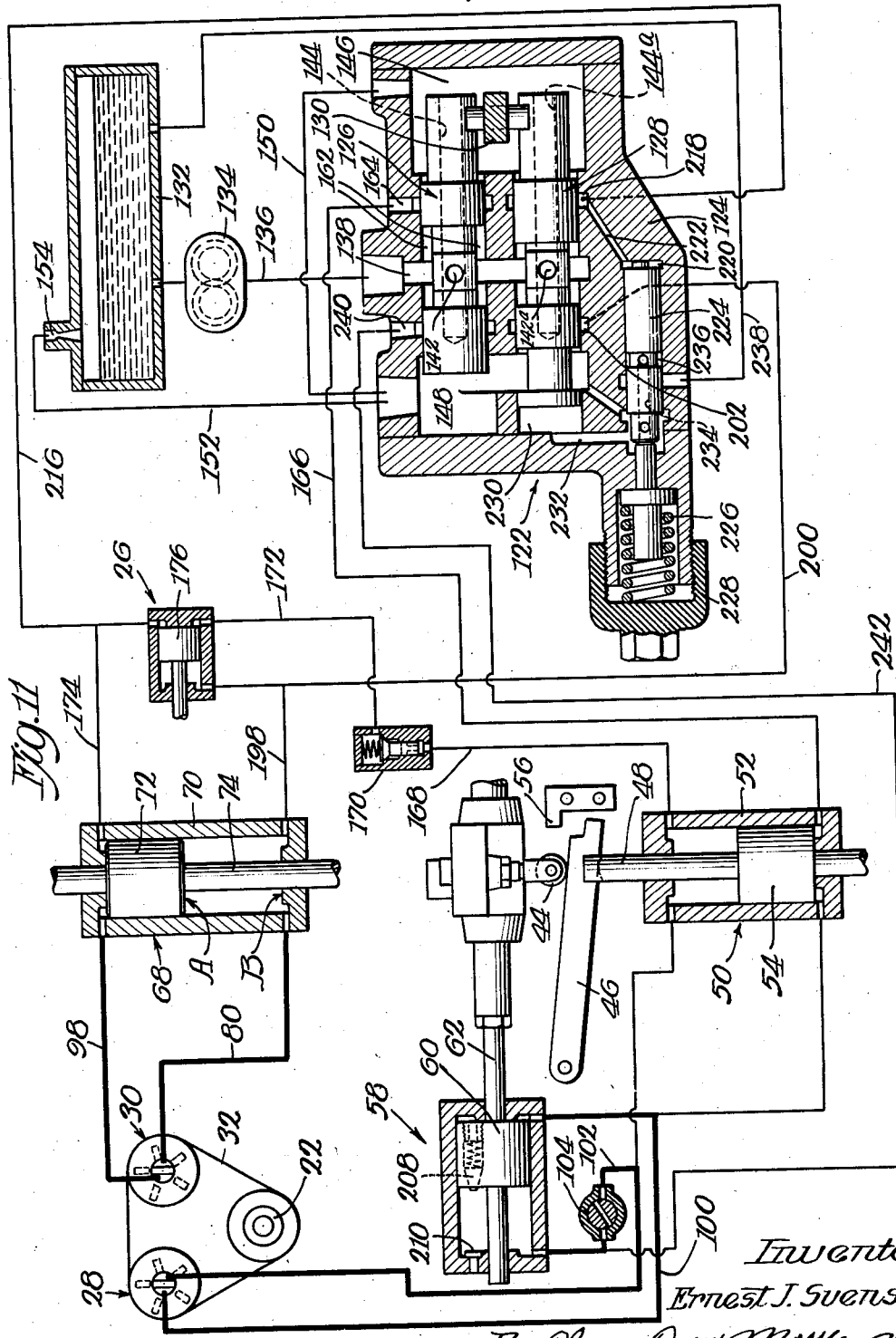
Inventor
Ernest J. Svenson
By Cheever, Cox & Moore Attys.

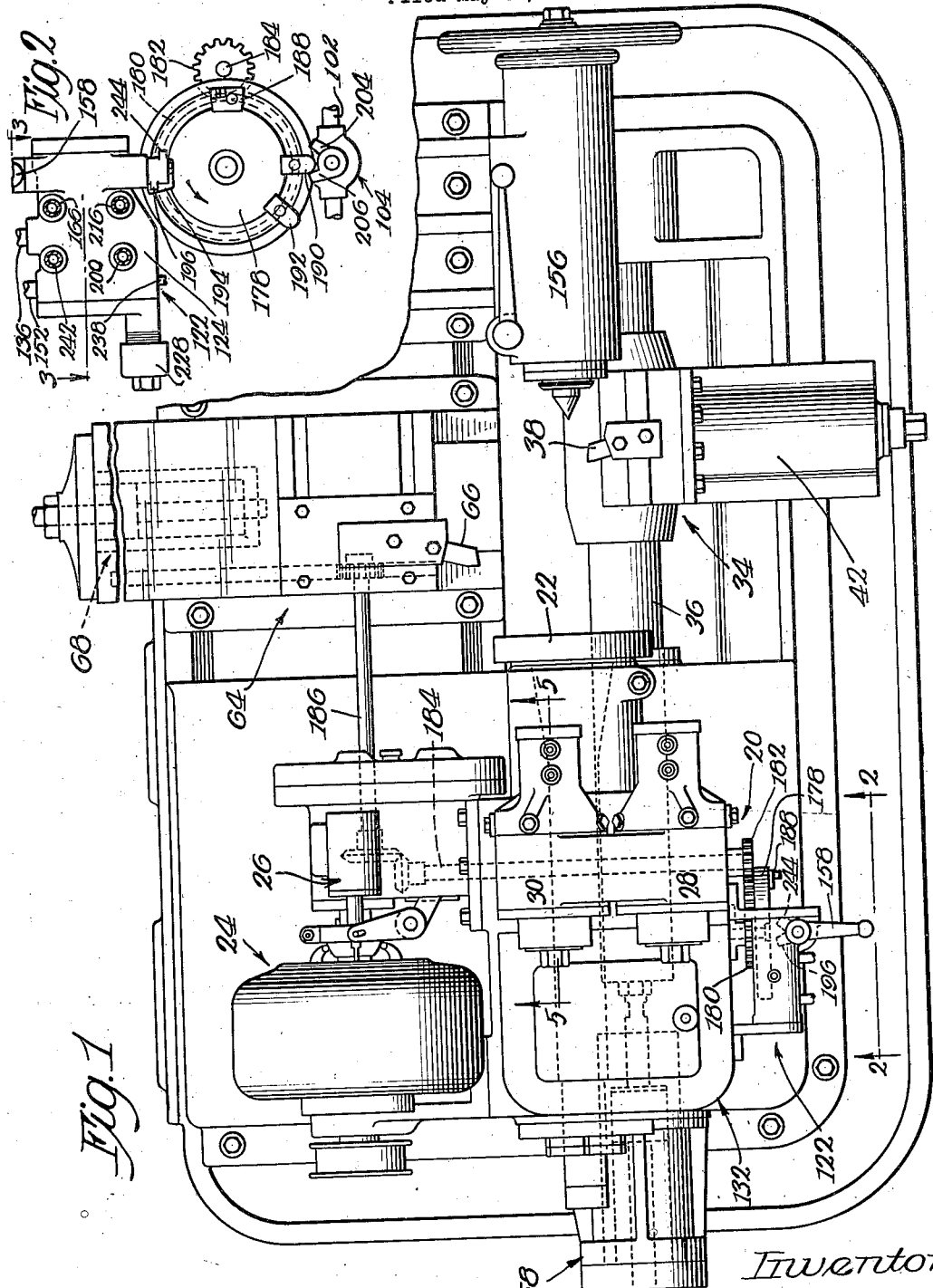

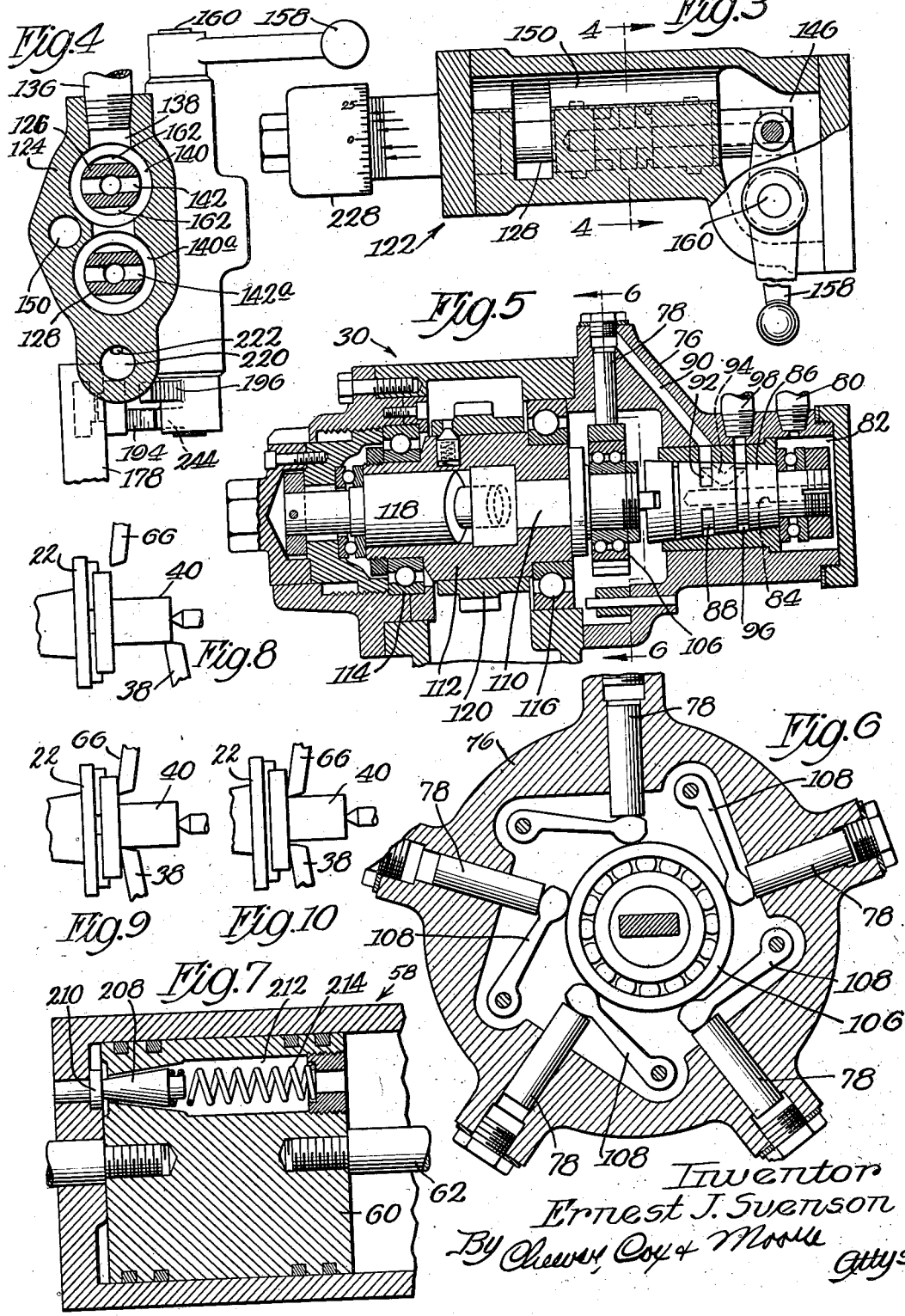

Patented Feb. 11, 1936

2,030,335

UNITED STATES PATENT OFFICE 2,030,335

MATERIAL WORKING APPARATUS

Ernest J. Svenson, Rockford, Ill.

Application May 15, 1931, Serial No. 537,647

43 Claims. (Cl. 82—2)

My invention relates generally to material working apparatus, and more particularly to material work'ng or cutting apparatus of the hydraulically controlled type.

In using material working apparatus, such as automatic lathes and machines of like nature, it frequently becomes necessary to cause a cutting tool at the end of its cutting stroke to dwell for a short interval of time before imparting a reverse movement thereto.

My present invention contemplates the provision of an improved hydraulic system of control for machine tools and the like, whereby this period of dwell may be very accurately controlled, and whereby the inherent spring in the machine elements, which is brought into play as a result of the sudden arresting of the forward movement cf the tool, is compensated for, thereby effecting an increase in cutting effectiveness of the tool.

My invention also contemplates the provision of a hydraulic system of control for machine tools and the like, in which the sudden increase of fluid pressure in one portion of the circuit, which is occasioned as a result of the sudden arresting of a hydraulic actuator for propelling a tool, serves to automatically effect the actuation of a reversing mechanism or valve, and also serves to control the period of dwell of the machine tool before the reversing thereof.

More specifically, my invention contemplates the provision, in combination with a hydraulic actuator including a piston shiftable within a cylinder for controlling the movement of a machine element, of means which is responsive to increases in fluid pressure resulting from the sudden interrupting of the travel of said actuator piston to effect the sudden shifting of a control valve.

Still more specifically, it is an object of my present invention to provide a mechan'sm which is connected with and responsive to increases in fluid pressures in a hydraulic circuit, which includes an actuator for propelling a machine part or the l ke, said mechanism being shiftable in response to said pressure increase so as to automatically effect the functioning of a control mechanism or valve.

Another object of my invention is to provide, in combination with a hydraulic actuator for rropelling machine tools and the l'ke, means to automatically effect the arresting of the movement of said actuator in such a manner as to enable the inherent spring or elasticity of the machine structure to cause the tool to move or spring away from the work piece simultaneously with the arresting thereof.

A further object of my invention is to provide, in combination with a piston of a hydraulic actuator for propelling machine tools and the like, automatically operable means which serves to establish communication between opposite sides of said piston when it reaches the limit of its stroke, whereby to effect the arresting thereof and to enable the inherent spring in the machine parts to cause the automatic shifting of the tool away from the work piece.

More specifically, my invention contemplates the provision of a material working apparatus, such as a hydraulically operable lathe having an actuator piston for shifting a rear tool carriage transversely of a work piece, a hydraulic actuator piston for shifting a front tool carriage longitudinally of a work piece, a third actuator piston for shifting the front tool carriage into cutting position with respect to the work piece, and means for automatically establishing communication between the opposite sides of the piston for longitudinally moving the front tool carriage when said carriage reaches the limit of its advancing movement, whereby to arrest the longitudinal travel of the front carriage and to simultaneously permit the spring in the machine parts, which is occasioned in response to the action of the third actuator piston, to automatically effect the withdrawal of the front tool away from the work piece.

The foregoing and numerous other objects and advantages will be more apparent from the following detailed description when considered in connection with the accompanying drawings, wherein—

Figure 1 is a fragmentary plan view of an automatic lathe which is representative of one type of material working apparatus adapted to be equipped with hydraulic mechanisms embodying features of my present invention;

Figure 2 is an enlarged front elevational view of the main control valve and mechanical actuating mechanism therefor, said view being taken substantially along the line 2—2 of Figure 1;

Figure 3 is an enlarged plan view shown partially in section of the control valve, said view being taken substantially along the line 3—3 of Figure 2;

Figure 4 is a vertical transverse sectional view of said valve mechanism taken substantially along the line 4—4 of Figure 3;

Figure 5 is a central transverse sectional view of one of the plunger pumps, said view being taken substantially along the line 5—5 of Figure 1;

Figure 6 is a transverse sectional view of said pump taken substantially along the line 6—6 of Figure 5;

Figure 7 is an enlarged central sectional view of the piston which forms a part of the hydraulic actuator for shifting the front tool carriage longitudinally of the work piece;

Figures 8 to 10 inclusive disclose successive positions occupied by cutting tools, said views being shown to more clearly illustrate one practical application of my present invention; and Figure 11 is a circuit diagram of my improved hydraulic system of control coupled with a vertical central sectional view of the main control valve.

Referring now to the drawings more in detail, wherein like numerals have been employed to designate similar parts throughout the various figures, it will be seen that for the purpose of illustrating one practical embodiment of my invention I have disclosed the same in operative association with an automatic lathe which is structurally similar to the lathe disclosed in my co-pending application, Serial No. 439,306, filed March 27, 1930. In view of the fact that the lathe structures have been described in detail in the above mentioned application, it will not be essential for a clear understanding of the present invention to discuss the specific arrangement of the lathe elements, except as certain of these structures enter into the general combination with my improved system of hydraulic control.

It will be seen that I have disclosed a lathe having a headstock designated generally by the numeral 20, and this headstock includes a rotary lathe spindle 22 driven from any suitable source of power supply, such as an electric motor (not shown). Power may be delivered from an electric motor through a clutch mechanism 24, which clutch is operated by a hydraulic actuator mechanism 26. The spindle 22 is connected with a pair of plunger pumps 28 and 30 by any suitable means, such as a chain 32 shown diagrammatically in Figure 11. By this arrangement the pumps are driven in timed relation or synchronism with the spindle 22.

The lathe also includes a front tool carriage designated generally by the numeral 34, which is mounted upon a longitudinally shiftable bar or shaft 36, said carriage being oscillatable upon the bar 36 for the purpose of shifting a cutting tool 38 into and out of association with respect to a work piece 40 shown diagrammatically in Figures 8 to 10 inclusive. The carriage 34 is provided with a forwardly extending section 42, and secured beneath this section 42 at the outer extremity thereof is a roller 44, Figure 11, which is supported on the upper surface of a guide bar 46. This guide bar 46 is pivotally mounted at its left extremity to the front side of the machine frame, and the free extremity thereof is carried by the upper end of a piston rod 48 which forms a portion of a hydraulic actuator designated generally by the numeral 50. This actuator includes a cylinder 52 and a piston 54 shiftable therein. When the piston 54 is urged upwardly, the carriage 34 is swung so as to move the tool 38 into proper cutting position with respect to the work piece, and a stop 56 cooperates with the free end of the bar 46 to limit the upward movement of the actuator piston rod 48. After the tool 38 has been properly positioned for making a cut upon the work piece, a hydraulic actuator 58 serves to effect movement of the front carriage 34 to the left longitudinally of the work piece. This actuator 58 includes a piston 60 and a piston rod 62 which is connected with the left end of the longitudinally shiftable and oscillatory bar 36. A rear tool carriage 64 provides a support for a cutting tool 66, which tool is normally employed to make a facing cut upon the work piece. Movement of the tool 66 toward and away from the work piece is occasioned by means of a hydraulic actuator 68, which includes a cylinder 70, a piston 72, and a piston rod 74.

The plunger pumps 28 and 30 are preferably of one of the types disclosed in a number of my co-pending applications, particular reference being made to my co-pending application, Serial No. 456,572, filed May 28, 1930, which has since the filing of the present application matured into Patent No. 1,924,423. I also wish to make reference to a similar type of pump shown in my Patent No. 1,989,117. For a clear understanding of the present invention it will suffice to say that the present invention are constructed so as to positively avoid difficulties due to leakage and fluid slippage which have been experienced heretofore in using conventional pumping devices. My pumps are particularly adapted to be used in a closed circuit, the fluid discharged from the advancing side of the piston of an actuator, such, for example, as the actuator piston 72, Figure 11, being sufficient to charge the pump. The inherent structural characteristics of the pump enable the functioning thereof in the manner set forth above. In other words, no leakage takes place within the pump, and therefore all of the fluid received by the pump for charging purposes is discharged at a higher pressure by the pump for propelling the actuator piston at a feeding rate.

Each of the pumps 28 and 30 includes a stationary support or cylinder block 76 and a plurality of radially reciprocable pistons or plungers 78 therein. Fluid from the advancing side of the actuator piston 72 is directed through a pipe line 80, Figures 5 and 11, which connects with a chamber 82 of the pump 30. This fluid is directed through a central passage 84 of a rotary tapered valve 86 to a peripheral port 88. This peripheral port successively registers with passageways 90 during the intake stroke of the pistons 78. During the outward or compressing stroke of the pistons a peripheral valve port 92 communicates therewith and conducts fluid under high pressure through a valve passage 94 to an annular valve port 96, which is in continuous communication with a pipe line 98. This pipe line 98 communicates with the opposite side of the actuator piston 72. The actuator piston 60, which serves to impart movement to the front carriage longitudinally of the work piece, is similarly connected with the pump 28, a pipe line 100 serving to connect the high pressure side of the pump 28 with the right end of the actuator 58, while a pipe line 102 and a valve 104 serve to connect the opposite end of the actuator 58 with the intake side of the plunger pump 28 (see Figure 11).

Outward movement is imparted to the pump plungers 78 by means of an eccentric driving ring 106 and pivoted fingers 108, which are interposed between the inner ends of the plungers and said driving ring. These fingers are constructed in accordance with the teachings set forth in my above mentioned co-pending plunger pump application, and by reason of their particular configuration I am not only able to preclude the transmission of side thrust to the piston but also to impart a simple harmonic movement to the pistons as distinguished from conventional types of eccentric driving mechanisms. In this manner I am able to produce a uniform displacement of fluid within the pipe lines connected with the pumps without the slightest degree of pulsation in the fluid circuits. The driving ring 106 is carried by a rotary driving member 110, which is laterally adjustable with respect to and driven by a sleevelike driving element 112, which is mounted upon fixed anti-friction bearings 114 and 116. Longitudinally shiftable within the driving member 112 is a member 118 which is adapted to accurately adjust the driving member 110 transversely of the member 112. Surrounding the driving member 112 is a roller chain sprocket 120, which cooperates with the chain 32, Figure 11, in connecting the pump with the lathe spindle 22.

To accurately and positively control the functioning of the hydraulic actuators 50, 58, and 68 in proper timed relation, I employ a valve mechanism which I have designated generally by the numeral 122, Figures 1 to 4 inclusive and Figure 11. This valve mechanism includes a main valve casing 124, which houses a pair of parallel valve members 126 and 128, which are connected by a member 130, Figure 11. The functioning of this valve mechanism 122 will be more easily understood if described in connection with the fluid circuits for controlling the functioning of the hydraulic actuators already described. Assume that the valve members 126 and 128 occupy the position shown in Figures 1 to 4 inclusive and Figure 11. In this position fluid from a reservoir 132 is delivered by a low pressure gear pump 134 through a pipe line 136 to a valve port 138. From this port fluid is directed through an annular valve passage or port 140, (Figure 4), which at this instance communicates with radial ports 142 of the valve member 126. The annular passage or port 140 communicates with a similar passage 140a, and thus fluid is also directed from the port 140a through radial ports 142a of the valve member 128. From these radial ports 142 and 142a fluid passes through longitudinal passageways 144 and 144a respectively, and thence into a chamber 146 provided at the right end of the valve mechanism, as clearly shown in Figure 11. This chamber 146 communicates with a chamber 148 at the left end of the valve mechanism through a passage 150 which is shown diagrammatically in Figure 11 and which is shown structurally in Figure 4. Thus opposite extremities of the valve members 126 and 128 are subjected to equal pressure, or, in other words, are substantially in balance. Fluid from the chamber 148 passes through a pipe line 152 through a fixed restricted orifice 154 and into the reservoir 132. The position of the valves just described may be referred to as the neutral position because in this position the low pressure fluid from the gear pump 134 is not employed to impart movement to any of the actuator pistons.

Assume that a work piece corresponding to the work piece shown diagrammatically in Figures 8 to 10 inclusive has been mounted between the spindle 22 and the tailstock 156, and assume further that power from the prime mover or motor (not shown) is being transmitted to the clutch mechanism 24, and that said clutch mechanism occupies its disengaged position. The operator now shifts the valve members 126 and 128 to the right by manipulating a control handle 158, Figures 1 to 4 inclusive. This control handle 158 is pivotally mounted at 160, and the inner end thereof connects with the right extremity of the valves. Thus when the handle 158 is shifted to the left, Figure 3, the valve members will be shifted to the right. With the valve members shifted to their extreme right position, which will be hereinafter referred to as the rapid approach position, low pressure fluid from the valve port 138 is conducted through lateral valve ports 162 of the valve 126 into a valve port 164, which communicates through a pipe line 166 with the lower end of the hydraulic actuator 50. This causes the front tool carriage 34 to be swung so as to bring the front tool 38 into proper cutting position with respect to the work piece 40. Fluid from the upper end of the actuator 50 passes through a pipe line 168, a check valve 170, and a pipe line 172, through the hydraulic actuator 26 and then through a pipe line 174, which connects with the rear end of the actuator 68, Figure 11. In this manner the actuator piston 72 and consequently the tool 66 experience rapid approach movement. The pressure of the fluid in the right end of the actuator 26 causes the piston 176 of said actuator to be shifted to the left, thereby actuating the clutch 24 so as to establish a driving connection between the prime mover and the work spindle 22. Rotation of the spindle causes the plunger pumps 28 and 30 to be activated.

The forward movement of the rear tool carriage 64 causes a control disk or plate 178, Figures 1, 2, and 4, to rotate. This disk is connected to the rear tool slide by a gear 180, a pinion 182 meshing therewith, a shaft 184 connected by bevel gears to a shaft 186, said shaft 186 being connected by a rack and pinion to the underside of the carriage 64. The plate or disk 178 supports a plurality of dogs 188, 190, 192, and 194, which are adjustably mounted thereon. During the forwarding movement of the carriage 64, the plate rotates in a counter-clockwise direction, as viewed in Figure 2, and when the actuator piston 72 reaches the limit of its rapid approach movement, the dog 188 engages a finger 196 mounted at the lower end of the vertical shaft which carries the control handle 158, Figures 2, 3, and 4. This causes the valve members 126 and 128 to be shifted to their neutral position, thereby rendering the low pressure circuit including the gear pump 134 functionally inoperative for propelling purposes.

During the rapid approach movement of the piston 72, fluid from the advancing side thereof passes through a pipe line 198 and a pipe line 200 which communicates with a valve port 202. This port is then in communication with the low pressure chamber 148, and fluid is free to pass through the pipe line 152 and the restricted orifice 154. When the valve members 126 and 128 are returned to their neutral position from the above mentioned rapid approach position, the feeding circuits including the plunger pumps and the pipe lines connecting said pumps with their respective actuators, are rendered functionally operative for shifting said actuators at a feeding rate. In other words, when the valves 126 and 128 are shifted to the position shown in Figure 11, the closed feeding circuit including the pump 30 and the pipe lines 80 and 98, serves to impart an approach feeding movement to the piston 72. At a predetermined interval depending upon the positioning of the dog 192 on the plate 178, the valve 104 will be shifted so as to establish communication between the left end of the actuator 58, Figure 11, and the charging side of the pump 28. Mounted upon the same shaft which supports the valve 104 is a finger 204 adapted to be engaged by the dog 192 when the disk 178 rotates in a counter-clockwise direction as viewed in Figure 1, and a finger 206 which is positioned in the path of the dog 190 as the plate rotates in a clockwise direction upon the reverse movement of the tool carriages. When the valve 104 is open, the closed circuit including the pipe lines 100, 102, and the plunger pump 28 serves to impart feeding movement to the left of the actuator piston 60 and consequently a feeding movement to the tool 38.

In performing cutting operations on a work piece such as the work piece 40, it is preferable to complete the surface cut by the tool 38 before completing the facing cut by the tool 66. As the tool 38 reaches the limit of its cutting stroke, a tapered valve member or plunger 208 mounted within the piston 60 engages an abutment 210, Figures 7 and 11. This causes communication to be established between the opposite sides of the piston 60 within the actuator 58 through a passageway 212 extending longitudinally of the piston 60. A coil spring 214 serves to normally seat the valve 208 when said valve is moved away from the abutment 210. Establishing communication between the opposite sides of the piston 60 obviously equalizes the pressure on opposite sides thereof and the forward travel of the tool is interrupted. In this connection attention is directed to the fact that when the tool 38 is moved to its cutting position and the free end of the bar 46 engages the stop 56, there will be a certain amount of tension stored up in these parts as a result of the inherent elasticity or spring in the metal. When the fluid pressure on the opposite sides of the piston 60 is equalized as a result of the shifting of the valve member 208, this stored-up energy within the machine parts causes the tool 38 to slightly withdraw from the work piece. Thus I provide means for automatically stopping the actuator piston 60, the equalizing of fluid pressure on opposite sides thereof, and the withdrawal of the tool sufficiently to prevent any cutting action during the dwell of said tool. The rear tool 66 continues to advance and upon the completion of its facing cut, the forward surface A of the piston 72 engages the surface or abutment B, Figure 11. For a clear understanding of the functioning of the tools 38 and 66, reference is made to the diagrammatic disclosures in Figures 8 to 10 inclusive. Figure 8 discloses the beginning of the surface cut by the tool 38; Figure 9 discloses the completing of the surface cut by the tool 38 ahead of the facing cut by the tool 66; and Figure 10 discloses the tool 38 sprung away from the surface of the work piece while the tool 66 completes its facing cut.

The engagement of the surface A of the piston 72 with the surface or abutment B obviously causes a sudden increase of fluid pressure in the pipe lines 98 and 174. The pipe line 174 is connected by a pipe line 216 with an annular port 218 in the valve mechanism 122, Figure 11. This annular port connects with a valve chamber 220 through a passageway 222. It will therefore be apparent that the sudden increase in fluid pressure resulting from the interruption of the advancement of the piston 72 causes a valve member 224 to be suddenly shifted to the left against the action of a coil spring 226. The coil spring 226 may be adjusted by means of a cap 228 to yield in response to various degrees of pressure. The shifting of the valve 224 to the left establishes communication between a chamber 230 at the left end of the valve member 128 and the reservoir 132 through a passage 232, a central valve passage 234, an annular port 236, and a pipe line 238. This serves to unbalance the fluid pressures at the opposite ends of the valve member 128, thereby causing said valve and its companion valve 126 to be suddenly shifted to the left. This left position of the valve will be hereinafter referred to as the rapid reverse position.

In this left shifted position of the valves 126 and 128 fluid from the gear pump 134 is directed through a valve port 240 and a pipe line 242 to the left end of the actuator 58, thereby causing the piston 60 to be moved at a rapid rate in a reverse direction, namely, to the right, Figure 11. The weight of the front carriage is sufficient to automatically cause the lowering of the actuator piston 54, and fluid from the advancing side of the piston 60 is conducted through the lower end of the actuator cylinder 52 and thence through the pipe line 166 into the valve port 164, which is then in communication with the low pressure side of the system. Low pressure fluid is also discharged from the valve 128 through the pipe lines 200 and 198 into the forward end of the actuator cylinder 70. This causes a rapid reverse movement of the actuator piston 72 and consequently of the rear tool carriage 64. The reversal in the flow of fluid in the low pressure system or circuit causes the clutch control piston 170 to be urged to the right, Figure 11, thereby automatically disengaging the driving power from the spindle 22. The valve 104 is closed in response to the engagement of the dog 190 with the finger 206, and when the actuator piston 72 reaches the limit of its rearward stroke, the dog 194 engages a finger 244. This causes the valve members 126 and 128 to be shifted to their neutral position and the lathe is then in condition to perform a second cycle of operation by merely imparting movement to the control handle 158.

By employing the valve member 224 which is shiftable in response to sudden increases in pressure conditions within the operating circuit, I am able to very effectively and accurately cause the reversal of the actuator pistons. By adjusting the cap 228, I can vary the pressure which is required to effect the reversal of the actuator pistons, and in this manner I am able to control the period of dwell which may be desired at the end of the cutting stroke of the tool. Thus, for example, if a predetermined dwell is required at the end of the cutting stroke of the rear tool 66, it is only necessary to adjust the tension in the spring 214 so that reversal will not take place until a predetermined pressure is developed in the feeding circuit. Any spring in the mechanical parts such as the parts constituting the hydraulic actuator 68, is taken up or compensated for during this increase in pressure, and hence no error is introduced in the cutting action of the tool upon the work piece. Causing the surfaces A and B in the actuator 68 to engage, provides a definite and accurate stopping position for the tool. Such a construction is particularly advantageous in instances where the tool must be reversed at a predetermined position measured within fractions of a thousandth of an inch.

It will also be apparent that my invention provides effective means whereby the reversal of a hydraulic actuator piston automatically occurs when abnormal conditions in the circuit are presented. In other words, my invention provides a very effective means for causing the reversal of an actuator piston when the fluid circuit is subjected to overload conditions. If for some reason one of the cutting tools is suddenly interrupted or obstructed in its movement, the increase in fluid pressure resulting therefrom will immediately and automatically effect the reversal of the tool.

My improved automatic overload release has a very practical application in connection with machine operation in instances where a tool is broken during the functioning of the machine, in which instance sufficient pressure is suddenly built up as the result of abnormal operating conditions to cause actuation of the valve member 224. Also, in instances where foreign matter inadvertently becomes lodged within the machine elements so as to momentarily interrupt the functioning thereof, the valve member 224 automatically functions in response to the change in pressure conditions within the system, to effect the immediate reversal of the machine. My invention is also adaptable for use in connection with machines, such as forging presses and the like, whereby it becomes necessary to increase the pressure on the actuator piston a substantial degree before the reversal takes place, and also to have this pressure increase constant for a certain length of time before reversal. In lathes or other machines equipped with my invention which are employed to make cuts in castings, said machines may be adjusted so as to effect the automatic reversal of the machine in instances where the casting contains hard spots. The engagement of the tool with these hard spots may be sufficient to build up a pressure within the system which will operate the valve 224, thereby automatically apprising the operator of the fact that the casting is unfit to be machined. The functioning of the adjusting cap 228 and its associated parts will be more readily apparent when it is understood that, by properly adjusting the responsiveness of the valve 224, the machine will automatically reverse when the cutting tool needs resharpening. In other words, when the cutting tool becomes dull and causes sufficient pressure or overload conditions to be experienced by the fluid within the system, the trip mechanism or valve 224 will automatically function to effect the reversal of the machine. Thus it will be apparent that my invention contemplates the provision of an automatic trip or overload mechanism which serves the dual function of an overload release or reversing device and a device which, as a result of its functioning, apprises the machine operator of the necessity of resharpening the cutting tool.

As the actuator piston 72 engages the piston abutment or surface B, Figure 11, the pressure in the charging pipe 80 is obviously relieved and consequently the load is removed from the front portion of the piston. This load, however, is added to the compression load on the opposite side of the piston, which serves to increase pressure on the piston at the end of its stroke. This arrangement is particularly advantageous in instances where it is desirable to employ a relatively low pressure during the cutting movement of a tool, and a greater pressure at the end of the piston stroke.

It will be noted that certain subject matter disclosed herein, such as the closed circuit arrangement, series circuit arrangement, control valve structure, etc., is similar to that disclosed in earlier filed copending applications, namely the above mentioned application Serial No. 439,306, as well as my copending application Serial No. 481,742, filed September 13, 1930. The broader claims directed to this subject matter are presented in said earlier filed applications, and the claims in the present application have been drawn so as to clearly and patentably distinguish from the subject matter described and claimed in the aforementioned copending applications.

Obviously my invention is not limited for use in connection with lathes, but is capable of application in various types of apparatus, such as grinding, boring, milling, and other material working machines.

Having thus described my invention, what I claim as new and desire to secure by Letters Patent is:

1. In a hydraulic actuator system for propelling machine parts and the like, a hydraulic actuator including a piston within a cylinder, fluid propelling mechanism for imparting movement to said actuator, means for driving said fluid propelling mechanism, shiftable normally balanced valve means for controlling the functioning of said actuator, and means responsive to increases in pressure within said actuator for controlling the movement of said shiftable valve means.

2. In a hydraulic actuator system for propelling machine parts and the like, a hydraulic actuator including a piston within a cylinder, fluid propelling mechanism for imparting movement to said actuator, means for driving said fluid propelling mechanism, a shiftable valve mechanism for controlling the functioning of said hydraulic actuator, said valve mechanism having means for receiving fluid for valve balancing purposes, and means operable in response to increases in fluid pressure within said actuator for controlling the shifting of said valve mechanism.

3. In a hydraulic actuator system for propelling machine parts and the like, a hydraulic actuator including a piston within a cylinder, fluid propelling mechanism for imparting movement to said actuator in a given direction, means for arresting the advancement of said actuator, a normally balanced fluid control means, and means responsive to increases in fluid pressure on the trailing side of said piston resulting from the stopping of said piston, said latter means serving to affect the balanced condition of said control means and thereby render the pumping mechanism functionally inoperative.

4. In a hydraulic actuator system for shifting machine parts and the like, a hydraulic actuator including a piston within a cylinder, a pumping mechanism connected with said actuator for imparting feeding movement to said actuator, a relatively low pressure pumping mechanism for imparting rapid movement to said actuator, a normally balanced valve mechanism for selectively controlling the functioning of said pumping mechanisms, and means shiftable in response to increases in pressure of fluid from the first mentioned pumping mechanism within said actuator for controlling the shifting of said valve mechanism, said valve being shiftable by fluid from the low pressure pumping mechanism.

5. In a hydraulic actuator system for propelling machine parts and the like, a hydraulic actuator including a piston within a cylinder, fluid propelling mechanism for imparting movement to said actuator, means for driving said fluid propelling mechanism, shiftable valve means for controlling the functioning of said actuator, said valve means being normally balanced to permit manual manipulation thereof, means responsive to an increase in pressure within said actuator for controlling the movement of said shiftable valve means, and means for adjusting the responsiveness of said pressure responsive means to render the same operable under various predetermined fluid pressures.

6. In a hydraulic actuator system for shifting machine parts and the like, a hydraulic actuator including a piston within a cylinder, a pumping mechanism connected with said actuator for imparting feeding movement to said actuator, a relatively low pressure pumping mechanism for imparting rapid movement to said actuator, a normally balanced valve mechanism for selectively controlling the functioning of said pumping mechanisms, said valve mechanism including a shiftable piston valve, means shiftable in response to an increase in fluid pressure within said actuator for controlling the shifting of said valve mechanism, and means for varying the responsiveness of said pressure responsive shiftable means, whereby to timingly control the shifting of said valve mechanism.

7. A system of hydraulic control including a hydraulic actuator, a relatively high pressure pumping mechanism for imparting feeding movement to said actuator, a second pumping mechanism for imparting rapid traverse to said actuator, a shiftable normally balanced control valve mechanism adapted in one shifted position to direct fluid from the first pump for feeding purposes to said actuator independently of said second mentioned pumping mechanism, and means shiftable in response to fluid pressure variation within said actuator for controlling the shifting of said control mechanism.

8. A system of hydraulic control including a hydraulic actuator, a relatively high pressure pumping mechanism for imparting feeding movement to said actuator, a second pumping mechanism for imparting rapid traverse to said actuator, a shiftable normally balanced control valve mechanism for rendering the second pumping mechanism functionally inoperative for propelling purposes with respect to the actuator during the functioning of the first mentioned mechanism, and means responsive to pressure variation within said actuator for controlling the shifting of said control mechanism.

9. In a system of hydraulic control including a plurality of hydraulic actuators, each of said actuators including a piston within a cylinder, pumping means for imparting feeding movement to said actuators, a second pumping means for imparting rapid traverse to said actuators, a normally balanced valve mechanism adapted to simultaneously control the delivery of fluid by said pumping means to said actuators in either direction, and means responsive to pressure variation within said system for controlling the shifting of said valve mechanism.

10. In material working apparatus of the class described, a shiftable machine element, a hydraulic actuator for imparting movement to said machine element, said actuator including a piston within a cylinder, pumping mechanism for imparting feeding movement to said actuator, a rapid traverse pump, abutment means for suddenly interrupting the advancement of said actuator and the machine element driven thereby, a control valve shiftable by fluid from the rapid traverse pump, and means connected with the high pressure side of said actuator and responsive to increases in fluid pressures resulting from the sudden interruption of the movement of said actuator for controlling the shifting of said control valve to effect a reverse movement of said machine element.

11. In material working apparatus of the class described, a machine spindle, a carriage shiftable with respect to said spindle, a hydraulic actuator including a piston within a cylinder for imparting movement to said carriage, a pumping mechanism for imparting feeding movement to said actuator, shiftable normally balanced valve means for controlling the functioning of said actuator, means for interrupting the advancement of said actuator at a predetermined position, and means shiftable in response to increases in pressure conditions experienced as a result of the stopping of said actuator for effecting the balanced condition of said valve to effect the shifting thereof and thereby cause said carriage to be driven in a reverse direction.

12. A system of hydraulic control including a hydraulic actuator having a piston within a cylinder, pumping means for imparting movement to said actuator, and means for establishing communication between the opposite sides of the piston within said actuator cylinder whereby to arrest the movement thereof at a predetermined position.

13. A system of hydraulic control including a hydraulic actuator having a piston within a cylinder, pumping means for imparting movement to said actuator, and valve means operable when the actuator piston reaches a predetermined position within its cylinder to establish communication between the opposite sides of said piston and thereby deprive the fluid medium of its propelling effectiveness with respect to said piston.

14. In material working apparatus of the class described, a frame, a carriage shiftably mounted on said frame, mechanism for shifting said carriage to a predetermined position, a hydraulic actuator for shifting said carriage in another direction, said actuator including a piston within a cylinder, fluid propelling mechanism for imparting movement to said piston, and means for establishing communication between the opposite sides of said piston at a predetermined point, whereby to automatically deprive the fluid medium of its propelling effectiveness when said actuator has reached a predetermined position within the cylinder.

15. In an automatic lathe of the class described, a frame, a rotary work spindle, a tool carriage adapted to be shifted transversely and longitudinally of said work piece, mechanism for effecting the transverse shifting of said carriage, abutment means for limiting the movement of said mechanism, a hydraulic actuator for shifting said carriage longitudinally of the work piece, said actuator including a piston within a cylinder, fluid propelling mechanism hydraulically coupled with said actuator, and means for establishing automatic communication between opposite sides of said piston when the carriage reaches a predetermined position.

16. In an automatic lathe of the class described, a frame, a rotary work spindle, a tool carriage adapted to be shifted transversely and longitudinally of said spindle, mechanism for effecting the transverse shifting of said carriage, abutment means for limiting the movement of said mechanism, a hydraulic actuator for shifting said carriage longitudinally of the work piece, said actuator including a piston within a cylinder, fluid propelling mechanism hydraulically coupled with said actuator, means for establishing automatic communication between opposite sides of said piston when the carriage reaches a predetermined position, and a second hydraulic actuator for controlling the mechanism which transversely shifts said carriage, said actuator being hydraulically coupled with the first mentioned actuator.

17. In material working apparatus of the class described, a spindle, a plurality of carriages shiftable with respect to said spindle, a hydraulic actuator coupled with each of said carriages for effecting the shifting thereof, each of said actuators including a piston within a cylinder, fluid propelling mechanism for imparting movement to said actuators, and means associated with one of said pistons for establishing communication between the opposite sides thereof when an actuator reaches a predetermined position, whereby to effect the dwell thereof during the completion of the stroke of the other actuator.

18. In material working apparatus of the class described, a spindle, a plurality of carriages shiftable with respect to said spindle, a hydraulic actuator coupled with each of said carriages for effecting the shifting thereof, each of said actuators including a piston shiftable within a cylinder, fluid propelling mechanism for imparting movement to said pistons, means associated with one of said pistons for establishing communication between the opposite sides thereof when said piston reaches a predetermined position, whereby to effect the dwell thereof during the completion of the stroke of the other piston, and means for automatically effecting the reversal of said pistons.

19. In material working apparatus of the class described, a spindle, a plurality of carriages shiftable with respect to said spindle, a hydraulic actuator coupled with each of said carriages for effecting the shifting thereof, each of said actuators including a piston shiftable within a cylinder, fluid propelling mechanism for imparting movement to said pistons, means associated with one of said pistons for establishing communication between the opposite sides thereof when said piston reaches a predetermined position, whereby to effect the dwell thereof during the completion of the stroke of the other piston, means for automatically effecting the reversal of said pistons, a valve mechanism for controlling the delivery of fluid to said pistons, and means responsive to pressure conditions within the hydraulic actuator last to complete its movement for automatically shifting said valve mechanism to effect the reverse travel of said pistons.

20. In an automatic lathe of the class described, a rotary work spindle, front and rear tool carriages, a hydraulic actuator coupled with each of said carriages, each of said actuators including a piston shiftable within a cylinder, pumping means driven in synchronism with said spindle for propelling said pistons at a feeding rate, a low pressure pumping mechanism for propelling said pistons at a rapid rate, a shiftable valve mechanism for selectively controlling the operative functioning of said pumping devices, means associated with one of said pistons for establishing communication between the opposite sides thereof when it reaches a predetermined position within its cylinder, whereby to permit the continued movement of the other actuator piston, means for interrupting the advancement of said other actuator piston at a predetermined position, and means responsive to increases in fluid pressure resulting from the stopping of said last mentioned piston for automatically effecting the shifting of said valve mechanism, whereby to effect reverse movement of said actuator pistons.

21. In a hydraulic actuator system for moving machine parts and the like, a hydraulic actuator including a piston within a cylinder, fluid propelling means connected with said actuator for effecting a feeding movement to said piston, a shiftable valve mechanism having a neutral, forward, and reverse position, said valve mechanism being normally balanced, and mechanism for controlling the shifting of said valve mechanism to render said propelling means functionally inoperative when pressure conditions within the system increase above normal requirements.

22. In a hydraulic actuator system for moving machine parts and the like, a hydraulic actuator including a piston within a cylinder, fluid propelling means connected with said actuator for effecting a feeding movement to said piston, mechanism for rendering said propelling means functionally inoperative when pressure conditions within the system increase above normal requirements, and means for adjusting said mechanism to function in accordance with various degrees of fluid pressure in said system.

23. In a hydraulic actuator system for moving machine parts and the like, a hydraulic actuator, a feed pump connectable in a closed circuit with said actuator, a rapid traverse pump connectable with said actuator, valve means for controlling the operative functioning of said pumps with respect to said actuator, and means responsive to variation in pressure within the system for controlling the actuation of said valve means.

24. In a hydraulic actuator system for moving machine parts and the like, a hydraulic actuator, a feed pump connectable in a closed circuit with said actuator, a rapid traverse pump connectable with said actuator, valve means for controlling the operative functioning of said pumps with respect to said actuator, and means responsive to the variation of pressure in said closed circuit for controlling the actuation of said valve means.

25. In a hydraulic actuator system for moving machine parts and the like, a plurality of hydraulic actuators for shifting said parts, pumping means for moving said actuators at a feeding rate, pumping means for moving said actuators at a rapid rate, means for automatically rendering one of said pumping means functionally inoperative for propelling one of said actuators when said actuator reaches a predetermined position, a shiftable control valve, and means responsive to variation in fluid pressure within the system for controlling the shifting of said control valve.

26. In a hydraulic actuator system for moving machine parts and the like, a plurality of hydraulic actuators for shifting said parts, pumping means for moving said actuators at a feeding rate, pumping means for moving said actuators at a rapid rate, means for automatically rendering one of said pumping means functionally inoperative for propelling one of said actuators when said actuator reaches a predetermined position, a shiftable control valve, and means responsive to variation in fluid pressure for controlling the shifting of said valve to effect the reversal of at least one of said actuators.

27. A system of hydraulic control including a hydraulic actuator comprising a relatively shiftable piston and cylinder construction, pumping means for imparting movement to said actuator, and means carried by said piston for rendering said pumping means ineffective for propelling said actuator when said actuator reaches a predetermined position.

28. A system of hydraulic control including a hydraulic actuator comprising a relatively shiftable piston and cylinder construction, pumping means for imparting movement to said actuator, and shiftable means carried by said piston for rendering said pumping means ineffective for propelling said actuator when said actuator reaches a predetermined position.

29. A system of hydraulic control including a plurality of hydraulic actuators, each including a relatively shiftable piston and cylinder construction, a source of fluid power supply for said actuators, means for rendering the source of fluid supply ineffective for propelling one of said actuators without affecting the continued travel of the other actuator, shiftable valve means for controlling the timed reversal of movement of said actuators after both of said actuators have completed a stroke in a given direction, and means responsive to pressure variation in the system for controlling the shifting of said valve in timed relation with the movement of said actuators.

30. A system of hydraulic control including a plurality of hydraulic actuators, each comprising a relatively shiftable piston and cylinder construction, a pump companion to each actuator, a valve mechanism for controlling the reversal of said actuators, means for rendering at least one of said pumps ineffective for propelling its companion actuator without affecting the continued movement of the other actuator, and means for controlling the timed functioning of the valve mechanism.

31. A system of hydraulic control including a hydraulic actuator comprising a relatively shiftable piston and cylinder construction, a second similar actuator connected in series with the first actuator, whereby one actuator controls the degree of movement of the other, a source of fluid power supply for said actuators, valve means for controlling the delivery of fluid to said actuators, and means responsive to fluid variation in the system for controlling the timed functioning of said valve mechanism.

32. A system of hydraulic control including a hydraulic actuator for propelling a machine part or the like, a second hydraulic actuator, a pump companion to each actuator and connected in a closed circuit therewith, valve mechanism for controlling the timed functioning of said actuators, means for rendering one of said pumps functionally inoperative for propelling purposes with respect to the actuator companion thereto, and means responsive to variations in pressure conditions within the system occasioned when the other actuator reaches the limit of its stroke in a given direction for effecting the timed functioning of the valve mechanism to condition said actuators for reverse movement.

33. A system of hydraulic control including a hydraulic actuator comprising a relatively shiftable piston and cylinder construction, pumping means for imparting movement to said actuator, valve means for controlling the starting and reversal of said actuator, and control means hydraulically coupled with said actuator and with said valve means for controlling the timed shifting of said valve means to effect the reversal of said actuator, said control means being shiftable in response to increase in fluid pressure developed within the actuator upon reaching the limit of its stroke in a given direction.

34. In a machine tool structure, a rotary supporting spindle, driving means therefor, a reciprocable supporting member, a rapid traverse transmission for said supporting member, a slower feed transmission for propelling said supporting member independently of said rapid traverse transmission, power means for actuating said spindle driving means and said transmissions, shiftable control elements for selectively causing the reciprocable member to be driven by either of said transmissions, initiating members adapted to act upon said control elements to cause a preselected shifting of said control elements, a positive stop for said reciprocable member whereby to positively arrest the member during the slow feeding movement without stopping the slow feed transmission, and a shiftable element operable in response to the positive stopping of the reciprocable member for causing the stopping of said slow feed transmission.

35. In a machine tool structure, a rotary supporting spindle, driving means therefor, a reciprocable supporting member, a rapid traverse transmission for said supporting member, a slower feed transmission for propelling said supporting member independently of said rapid traverse transmission, power means for actuating said spindle driving means and said transmissions, shiftable control elements for selectively causing the reciprocable member to be driven by either of said transmissions, initiating members adapted to act upon said control elements to cause a preselected shifting of said control elements, said initiating members being shiftable in response to either of said transmissions, a positive stop for said reciprocable member whereby to positively arrest the member during the slow feeding movement without stopping the slow feeding transmission, and a shiftable element operable in response to the positive stopping of the reciprocable member for causing the stopping of said slow feed transmission.

36. In a machine tool structure, a rotary supporting spindle, driving means therefor, a reciprocable supporting member, a rapid traverse transmission for said supporting member, a slower feed transmission for propelling said supporting member independently of said rapid traverse transmission, means to vary the speed of said slow feed transmission, power means for actuating said spindle driving means and said transmissions, shiftable control elements for selectively causing the reciprocable member to be driven by either of said transmissions, initiating members adapted to act upon said control elements to cause a preselected shifting of said control elements, a positive stop for said reciprocable member whereby to positively arrest the member during the slow feeding movement without stopping the slow feed transmission, and a shiftable element operable in response to the positive stopping of the reciprocable member for causing the stopping of said slow feed transmission.

37. In a machine tool structure, a rotary supporting spindle, driving means therefor, a reciprocable supporting member, a rapid traverse transmission for said supporting member, a slower feed transmission for propelling said supporting member independently of said rapid traverse transmission, means cooperatively associated with said transmission for blocking one of said transmissions during the functioning of the other transmission, power means for actuating said spindle driving means and said transmissions, shiftable control elements for selectively causing the reciprocable member to be driven by either of said transmissions, initiating members adapted to act upon said control elements, a positive stop for said reciprocable member whereby to positively arrest the member during the slow feeding movement without stopping the slow feed transmission, and a shiftable element operable in response to the positive stopping of the reciprocable member for causing the stopping of said slow feed transmission.

38. In a machine tool structure, a rotary supporting spindle, driving means therefor, a reciprocable supporting member, a rapid traverse transmission for said supporting member, a slower feed transmission for propelling said supporting member independently of said rapid traverse transmission, power means for actuating said spindle driving means and said transmissions, shiftable control elements for selectively causing the reciprocable member to be driven by either of said transmissions independently, initiating members movable in synchronism with said reciprocable supporting member and adapted to act upon said control elements to cause a preselected shifting of said control elements, a positive stop for said reciprocable member whereby to positively arrest the member during the slow feeding movement without stopping the slow feed transmission, and a shiftable element operable in response to the positive stopping of the reciprocable member for causing the stopping of said slow feed transmission.

39. In a system of actuator control, a hydraulic actuator including a cylinder and piston structure adapted to shift a machine carriage, abutment means for positively arresting the movement of said actuator, a tool support, a hydraulic actuator including a cylinder and piston structure connectible with said tool support, and means for governing the timed functioning of said actuators including means for compensating fluid pressures on opposite sides of said first mentioned actuator upon the operative functioning of said abutment means, whereby to maintain the accurate position of the tool support during the operative functioning of a tool carried thereby.

40. In a system of actuator control, a hydraulic actuator including a cylinder and piston structure adapted to shift a machine carriage, abutment means for positively arresting the movement of said actuator, a tool support, a hydraulic actuator including a cylinder and piston structure connectible with said tool support, and means for governing the timed functioning of said actuators including means operable in response to the movement of one of said actuators for compensating fluid pressures on opposite sides of said first mentioned actuator upon the operative functioning of said abutment means, whereby to maintain the accurate position of the tool support during the operative functioning of a tool carried thereby.

41. In a system of actuator control, a hydraulic actuator including a cylinder and piston structure adapted to shift a machine carriage, abutment means for positively arresting the movement of said actuator, a tool support, a hydraulic actuator including a cylinder and piston structure connectible with said tool support, and means for governing the timed functioning of said actuators including shiftable valve means for compensating fluid pressures on opposite sides of said first mentioned actuator upon the operative functioning of said abutment means, whereby to maintain the accurate position of the tool support during the operative functioning of a tool carried thereby.

42. In a system of actuator control, a horizontally operable hydraulic actuator including a cylinder and piston structure adapted to shift a machine carriage, abutment means for positively arresting the movement of said actuator, a tool support, a vertically operable hydraulic actuator including a cylinder and piston structure connectible with said tool support, and means for governing the timed functioning of said actuators including means for compensating fluid pressures on opposite sides of said first mentioned actuator upon the operative functioning of said abutment means, whereby to maintain the accurate position of the tool support during the operative functioning of a tool carried thereby.

43. In a system of hydraulic control, a plurality of hydraulic actuators, each of said actuators including a piston within a cylinder, fluid power generating mechanism coupled with said actuators, and means associated with one of said pistons for establishing communication between the opposite sides thereof when an actuator reaches a predetermined position, whereby to effect the dwell thereof during the completion of the stroke of the other actuator.

ERNEST J. SVENSON.